March 18, 1952  F. J. McALPINE ET AL  2,589,837
BALE CONVEYER FOR ROTARY BALER
Filed May 11, 1949  3 Sheets-Sheet 2
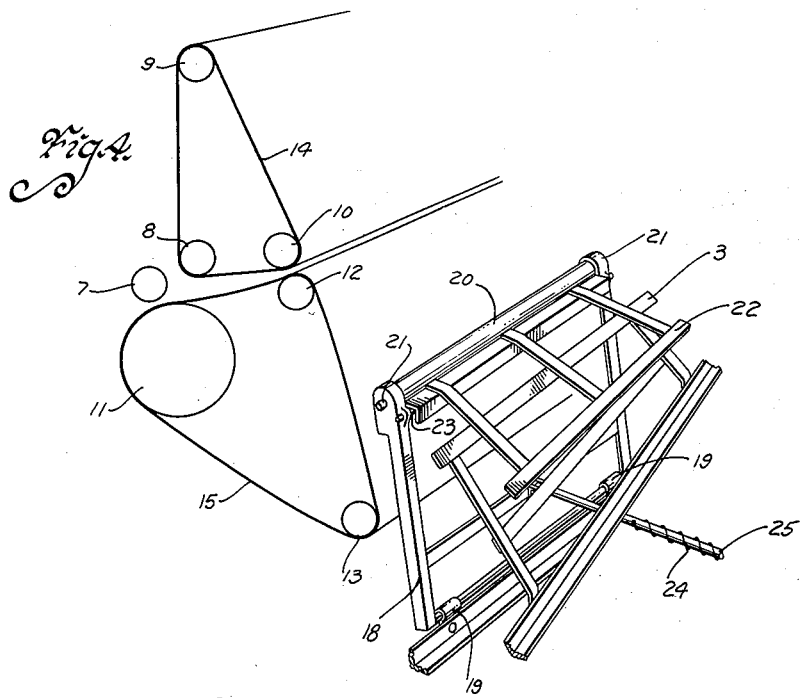
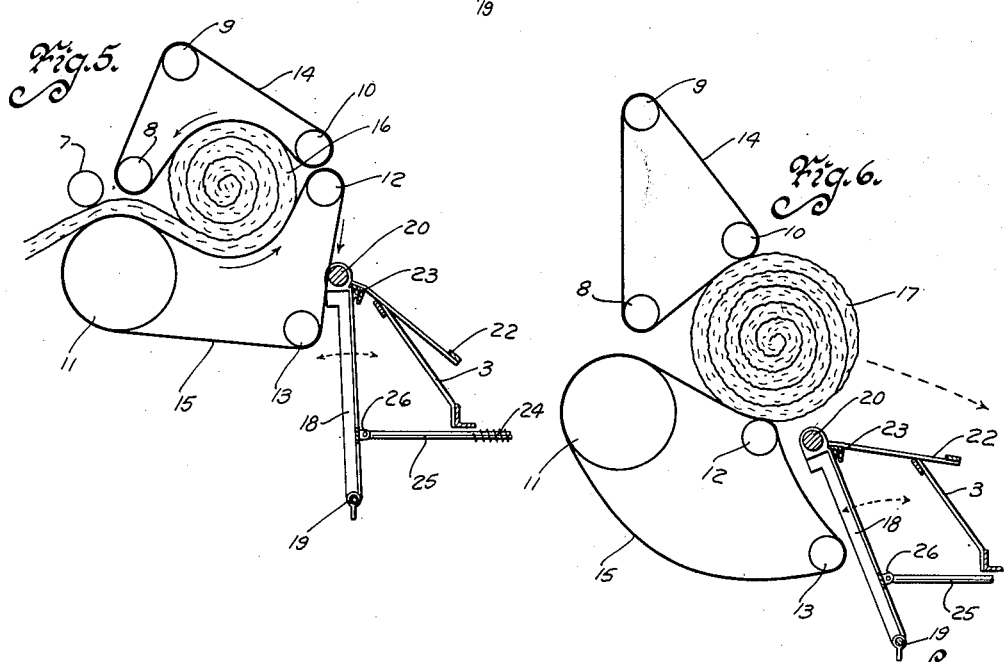

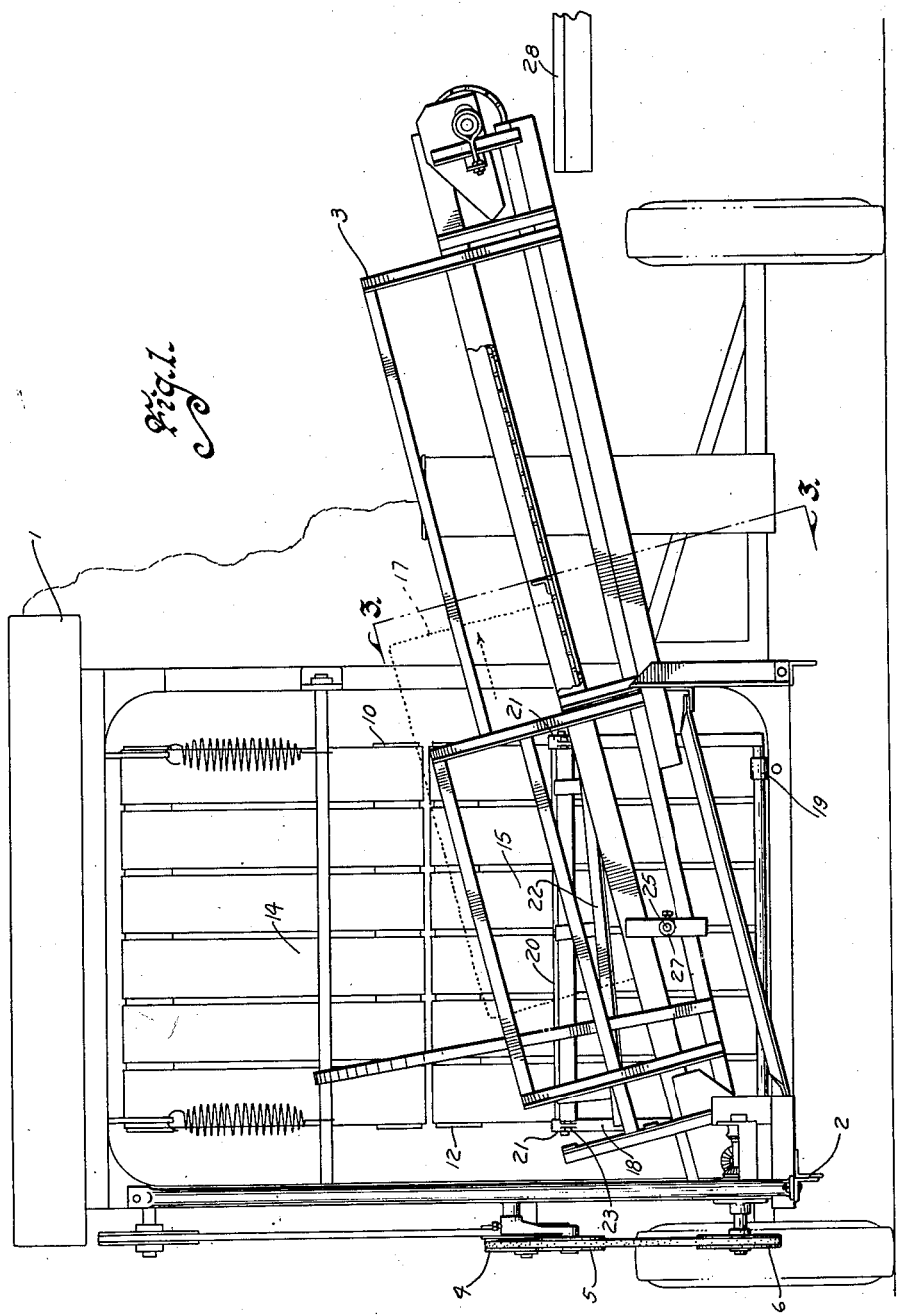

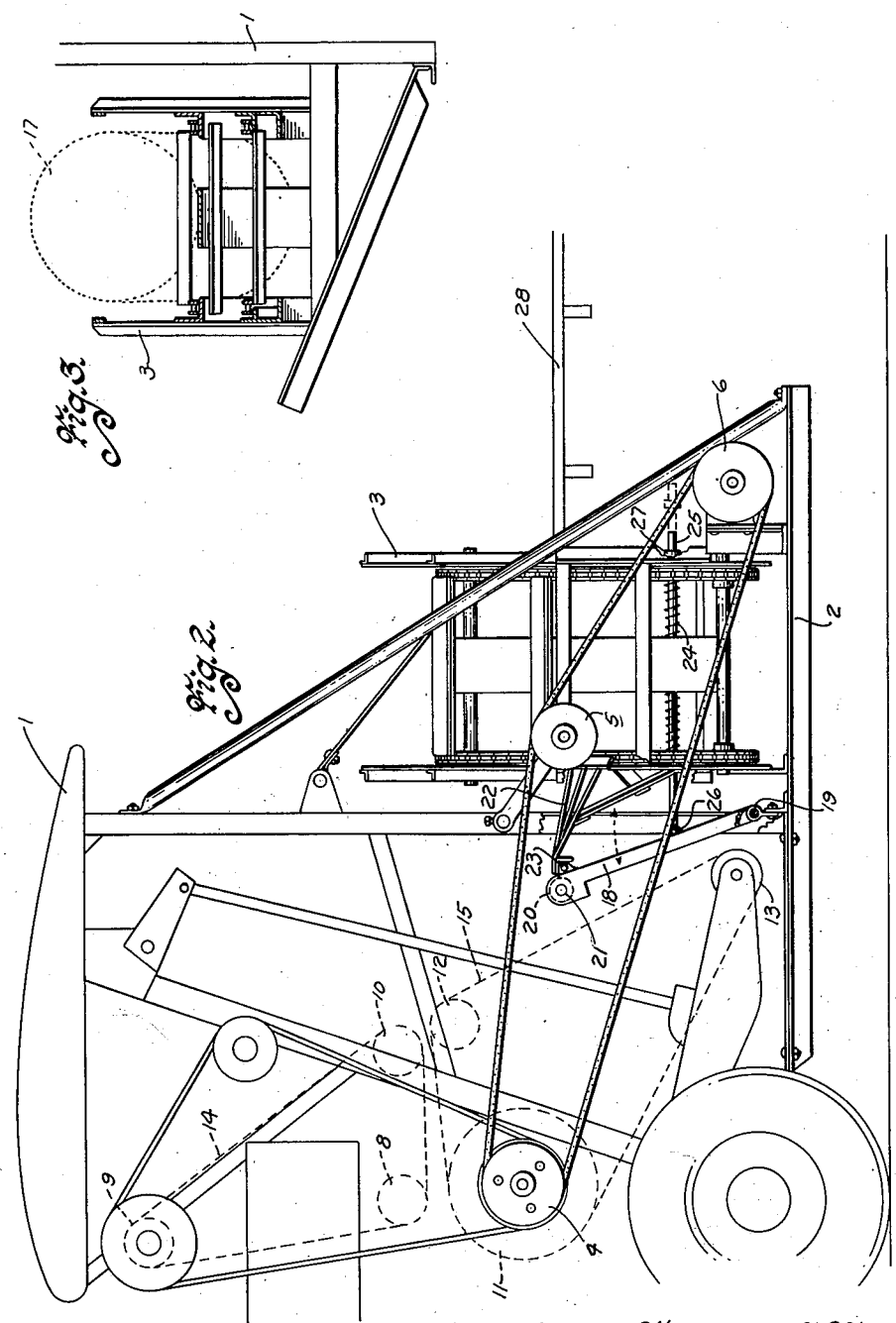

Patented Mar. 18, 1952

2,589,837

UNITED STATES PATENT OFFICE 2,589,837

BALE CONVEYER FOR ROTARY BALER

Francis J. McAlpine and Melvin L. McAlpine, Rowan, and R. E. Lee Aldrich, Jr., Belmond, Iowa Application May 11, 1949, Serial No. 92,562

2 Claims. (Cl. 100—16)

This invention relates to an improvement in a rotary hay baler and more particularly to a conveyor to receive the rotary hay bale when discharged from the hay baler and deliver the hay bale to a side delivery elevator to be elevated to a wagon.

The rotary hay baler is already a finished article and discharges a cylindrical bale of hay directly from the rear of the hay baler onto the ground. The operation of the baler is a one-man job except for later picking up the bales and loading them on a wagon for collecting them. It is highly desirable to collect the bales at the same time they are discharged from the baler and it is with this problem that the present invention is involved.

It is an object of the invention, among others, to provide a conveyor means for a rotary hay baler to receive a bale of hay discharged from a baler and guide the bale of hay to an elevator for collecting purposes.

It is another object of the invention to provide a conveyor means for a rotary hay baler to receive a bale of hay as it discharges from a hay baler, guide the bale of hay to an elevator and raise the bale of hay to a wagon all as a one man operation.

It is still another object of the invention to provide a conveyor means for a rotary hay baler to guide a bale of hay to a collecting means where the baling and collecting can be done with a minimum number of men.

It is a further object of the invention to provide a conveyor means for a rotary hay baler that is simple in construction and operation, easy to operate and economical both in construction and operation; a conveyor means that is long lasting and durable in operation, requiring few repairs and little loss in time in operation; a conveyor means easy to operate, simple in design and easy to repair in case of breakdown; a conveyor means requiring no special skill on the part of an operator to mount it on a baler; and a conveyor means that can be supplied at a very low cost.

With the foregoing and other objects in view, the invention will be more fully described herewith and will be particularly pointed out in the claims appended hereto.

In the drawings, wherein like symbols refer to like or corresponding parts throughout the several views:

Figure 1 is a rear view of a rotary hay baler with a side delivery elevator showing.

Figure 2 is a side view of the rear end of a rotary hay baler and showing a front view of an elevator.

Figure 3 is a sectional view on the line 3—3 of Figure 1.

Figure 4 is a schematic view showing the position of the belts of the hay baler before the bale is started and the position of the conveyor.

Figure 5 is a schematic view showing the position of the belts of the hay baler after the bale has started to form and the position of the conveyor.

Figure 6 is a schematic view showing the position of the belts after the bale is discharged and the position of the conveyor to receive the bale of hay.

The numeral 1 designates a rotary baler.

The bale is formed between two series of belts carried by the baler which rotate in opposite directions, thus forming a round or cylindrical bale, 36 inches in length and from 14 to 22 inches in diameter. The diameter and density of the finished bale can be varied by adjustments on the baler.

During operation of the baler, when the bale reaches its proper size, a pick-up apron of the baler automatically stops, then forward motion of the baler stops, and the baler continues to run by means of the power take-off. The bale is then spirally wrapped with twine and is then discharged from the baler. The discharge of the bale causes the pick-up apron to start again and forward motion of the baler is resumed and another bale formed.

The rolled bales of hay are discharged directly to the surface of the ground when completed and a separate loading apparatus is towed along the ground to pick up and load the bales. The present idea contemplates loading the hay bales from the baler into a side delivery elevator on the baler to a wagon.

The only change made in the baler 1 is to add a platform 2 to the rear of the baler 1. An elevator 3 is mounted on the platform 2 and extends to one side of the baler. The elevator 3 is powered from the baler 1 and comprises a pulley 4 connected to the baler mechanism for operating bale forming belts, a pulley 5 mounted on baler 1 to serve as belt tightener and a pulley 6 connecting to shafts to operate the elevator 3. The elevator 3 is regular standard model purchased on the open market and no claims of novelty are made of it.

Figures 4, 5 and 6 show schematically the forming of the bale in the baler 1. The hay from the windrow is entered into the baler 1 and passes under roller 7 to be formed into a layer. The layer of hay then passes two series of rollers 8, 9, and 10 and 11, 12, and 13. The rollers 8, 9 and 10 are covered by endless belts 14, while the rollers 11, 12 and 13 are covered by endless belts 15. As clearly shown in Figure 5, the belt 14 rotates in one direction while the belt 15 rotates in the opposite direction. The layer of hay 16 is circularly wound as shown in Figure 5, and when the proper size for a bale, the bale 17, Figure 6, is discharged from the baler 1. The operation up to now is the standard operation for forming a rotary hay bale.

As the hay bale 17 is discharged from the baler 1, the belts 14 and 15 are imparting rotary motion to the bale 17. This rotary motion of the bale 17 makes it hard to control and unpredictable as to where the bale will land. A guide means has been found necessary to direct the hay bale to the elevator 3.

The guide means is a hinged conveyor 18 and forms a link between the baler 1 and the elevator 3. It is very simply constructed being a square frame, slightly wider than the lower belt series 15 of the baler 1. The lower end of the conveyor 18 is hinged at 19 to baler 1, and the upper end of the conveyor 18 has a steel roller 20, about 1½ inches in diameter which is supported on each end by a bearing 21 so as to be free to rotate. An inclined platform 22 extends from the top of the conveyor 18 upon which the bale of hay 17 issuing from the baler 1 falls and is guided into the elevator 3. The platform 22 is hinged at 23 so it can adjust itself to different positions on the hinged conveyor 18. This "self-adjustment" of the platform 22 results from the fact that it is held in a position other than one vertically depending from the hinge point 23 solely by its engagement with the elevator 3. This is shown clearly in Fig. 4 of the drawings. Thus the platform 22 moves up or down according to the relative positions of the elevator and the baler.

In operation, as the bales are formed, the belts 14 and 15 of the baler 1, move to the rear several inches. About midway of their movement, the belts 14 contact the roller 20 and move the hinged conveyor 18 to the rear slightly. As soon as bale 17 is discharged, the belts 14 and 15 immediately return to their starting positions and at the same time the hinged conveyor 18 is forced forward to its original position by means of a compression spring 24. The spring 24 is held in position by means of a rod 25; the rod is attached to the elevator 3 and is attached to the hinged conveyor 18 at 26 so as to pivot. The rod 25 passes through a hole 27 in the elevator 3 at the rear.

The hay in the field is raked into windrows and fed into the rotary hay baler by moving the baler forwardly along the row. The hay baler operation for purposes of this invention are thought to be clear from the schematic diagrams and 28 represents a wagon that receives the bales as they are delivered. The rotary motion imparted to the bale of hay 17 when discharged, makes the bale hard to handle, in that the bale is hard to guide. The bale can get between the belts 14 and 15 and the elevator 3. A stationary platform or guide has been tried but proved unsuccessful.

The hinged conveyor 18, where the conveyor 18 follows the belts 14 and 15, always has the roller 20 close to the bale 17 so that the bale 17 contacts the roller 20 and the balance is such that the bale 17 will roll down the platform 22 into the conveyor 3. The conveyor 18 is always in position to receive the bale of hay 17 issuing from the baler 1 and guide it to the elevator.

It is to be understood that the form of my invention, herewith shown and described, is to be taken as a preferred example of the same, and that various changes in shape, size and arrangement of parts may be resorted to without departing from the spirit of my invention, or the scope of the subjoined claims.

Having thus described my invention, I claim:

1. A bale conveyor for use with an elevator mechanism in conjunction with a rotary baler of the type wherein the material to be baled is rolled between two sets of vertically spaced belts that are moving in opposite directions over rollers; and which rollers are moveable to permit the bale to grow in size as the machine operates; and the rearward portion of the path taken by the lower set of belts moves forwardly and downwardly to permit normal formation of the bale until the completed bale is finally ejected toward the rear of the baler; said bale conveyor comprising; a frame hingedly secured at its lower end to the rear end of said baler, a friction reducing means secured near the upper end of said frame, a bale guide platform member hingedly secured near the top of said frame and capable of overlapping a portion of an elevator mechanism used in conjunction with said baler; said bale guide platform member tending to depend from its point of hinged attachment under the force of gravity; and said bale guide platform member being prevented from depending substantially straight downwardly solely by its engagement with a portion of an elevator, and a means secured to said frame for yieldingly urging said friction reducing means into contact with the lower set of belts of said baler.

2. A bale conveyor to guide bales formed in a rotary baler onto a rearwardly positioned associated elevator; said baler being of the type wherein at least one endless belt in contact with the material to be baled moves over rollers and causes the material to be baled to roll into a cylindrical bundle of gradually increasing diameter which increase in diameter is compensated for by a downward and forward movement of at least one of the rollers over which said belt moves until the roller is below and forward of the center of a completed bale causing the bale to be ejected rearwardly from said baler; said conveyor comprising, a frame hingedly secured to said baler rearwardly of said belt, a means for yieldingly urging one end of said frame forwardly to be positioned near said belt as it passes over said roller that moves below a completed bale at the moment when a completed bale is ejected, and an inclined platform secured near said one end of said frame and extending rearwardly therefrom, said platform constructed and arranged to support a bale ejected from said baler to guide and convey said bale to said rearwardly positioned associated elevator.

FRANCIS J. McALPINE.
MELVIN L. McALPINE.
R. E. LEE ALDRICH, Jr.

REFERENCES CITED

The following references are of record in the file of this patent:

UNITED STATES PATENTS

| Number | Name | Date |
|---|---|---|
| 799,175 | Luebben | Sept. 12, 1905 |
| 862,105 | Reagan | July 30, 1907 |
| 866,702 | Weeks | Sept. 24, 1907 |
| 1,627,904 | Hurff | May 10, 1927 |
| 1,857,373 | Goggins | May 10, 1932 |
| 2,316,435 | James | Apr. 13, 1943 |
| 2,386,943 | Fourness | Oct. 16, 1945 |